United States Patent [19]
Goldstein et al.

[11] Patent Number: 5,419,987
[45] Date of Patent: May 30, 1995

[54] HIGH PERFORMANCE ZINC POWDER AND BATTERY ANODES CONTAINING THE SAME

[75] Inventors: Jonathan R. Goldstein; Inna Gektin; Yehuda Harats, all of Jerusalem, Israel

[73] Assignee: Electric Fuel (E.F.L.) Ltd., Jerusalem, Israel

[21] Appl. No.: 174,005

[22] Filed: Dec. 28, 1993

[51] Int. Cl.⁶ .............................................. H01M 4/42
[52] U.S. Cl. ...................... 429/229; 420/513; 205/64
[58] Field of Search ................ 429/229, 49; 205/309, 205/64; 420/513

[56] References Cited

U.S. PATENT DOCUMENTS

| | | | |
|---|---|---|---|
| 3,945,849 | 3/1976 | Hoffman | 136/107 |
| 4,084,047 | 4/1978 | Himy et al. | 429/206 |
| 4,112,205 | 9/1978 | Charkoudian et al. | 429/199 |
| 4,195,120 | 3/1980 | Rossler et al. | 429/50 |
| 4,432,937 | 2/1984 | Kuwayama et al. | 420/513 |
| 4,592,974 | 6/1986 | Takeda et al. | 429/229 |
| 5,108,494 | 4/1992 | Uemura et al. | 429/229 |
| 5,206,096 | 4/1993 | Goldstein et al. | 429/27 |
| 5,228,958 | 7/1993 | Goldstein et al. | 429/49 |
| 5,232,798 | 8/1993 | Goldstein et al. | 429/229 |

FOREIGN PATENT DOCUMENTS 0564664 10/1993 European Pat. Off. .

Primary Examiner—Stephen Kalafut
Assistant Examiner—Carol Chaney
Attorney, Agent, or Firm—Jacobson, Price, Holman & Stern

[57] ABSTRACT

An electrochemically prepared, high-performance, zinc powder has an apparent density of about 0.2-2 g/cc and a surface area of about 0.5-6 m²/gm and further has at least one corrosion inhibitor metal intrinsically alloyed therein.

9 Claims, No Drawings

HIGH PERFORMANCE ZINC POWDER AND BATTERY ANODES CONTAINING THE SAME

The present invention relates to high-performance zinc powder.

More particularly, the present invention relates to high-performance zinc powder especially for use in primary and secondary-based cells and batteries, especially in zinc-alkaline, zinc-manganese dioxide, silver-zinc and zinc-air cells which incorporate a zinc anode.

As is known, it is of importance in batteries containing zinc electrodes that the zinc should not be consumed by a reaction with aqueous electrolyte, especially alkaline electrolyte which generates hydrogen gas, which reaction merely corrodes the zinc and prevents its availability for producing electric current. A number of prior patents relate to this problem.

Thus, e.g., in U.S. Pat. No. 4,112,205, double salts containing both mercuric and quaternary ammonium ions are used as inhibitors in galvanic cells comprising zinc anodes, notably in Leclanche-type batteries containing ammonium chloride/zinc chloride electrolyte; U.S. Pat. No. 3,945,849 employs quaternary ammonium halides as inhibitor for zinc anodes in similar primary cells. U.S. Pat. No. 4,195,120 teaches alkaline cells containing a predominantly zinc anode and, as a hydrogen evolution inhibitor, a surfactant which is an organic phosphate ester of the ethylene oxide adduct type. Metal oxide inhibitors for zinc (in practice ZnO) electrodes are described in U.S. Pat. No. 4,084,047, in which the inhibitors are mixed thoroughly into the ZnO; the inhibitors taught in this patent are binary combinations of oxides which exclude mercuric oxide, the latter being regarded as an ecologically unsatisfactory additive for the ZnO electrode. According to U.S. Pat. No. 4,084,047, it was known to mix or alloy the active zinc in zinc-zinc oxide anodes and their supporting grid (e.g., copper or silver structures) with 0.5–5.0 wt. % mercury or mercuric oxide. Also in U.S. Pat. No. 4,195,120, mercury is used; however, more importantly, said patent starts with a block of zinc alloy which is then melted into droplets and solidified into particles (the so-called thermally atomized zinc), and the contact area between these solid particles is therefore quite limited.

According to the present invention, there is now provided an electrochemically prepared, high-performance, zinc powder having an apparent density of about 0.2–2 g/cc and a surface area of about 0.5–6 $m^2/gm$ and further having at least one corrosion inhibitor metal intrinsically alloyed therein.

In preferred embodiments of the present invention, said corrosion inhibitor metal is selected from the group consisting of antimony, bismuth, cadmium, gallium, indium, lead, tin and mixtures thereof.

Preferably, said inhibitor is present in said alloy in a weight ratio of zinc to inhibitor of 1:0.00001–0.04.

The invention also provides a battery anode comprising an electrochemically-prepared, high-performance zinc powder; a battery anode comprising an aqueous slurry of KOH and electrochemically-prepared, high-performance zinc powder pressed onto an anode collector, and a battery anode comprising a slurry of KOH and electrochemically-prepared, high-performance zinc powder, extruded onto an anode collector.

The invention further provides a high-performance, electrochemically-generated, zinc-inhibitor metal alloy powder, prepared by a process comprising electrolyzing an admixture of (a) zinc which has been at least partly oxidized to an oxidation product selected from the group consisting of zinc oxide, zinc hydroxide and zincates; (b) an aqueous solution of at least one Group Ia metal comprising anions selected from the group consisting of hydroxide and zincate; and (c) an inhibitor metal compound, e.g., an inhibitor metal oxide effective to inhibit the interaction of zinc and at least one Group Ia metal hydroxide in aqueous solution, which would otherwise result in the evolution of hydrogen gas, said inhibitor metal compound being capable of forming an alloy with zinc and being present in said admixture as a cation species selected from the group consisting of antimony, bismuth, cadmium, gallium, indium, lead, tin or a mixture thereof in a cell with a corrosion-resistant anode and a non-zinc-adherent cathode such that the zinc and inhibitor metal from said compound which codeposit on said cathode self-detach or are removable by a method selected from brushing, scraping, vibrating, the use of liquid jets, either fixed or moving, and the use of electrical pulsing, until no more than a preselected amount of zinc remains in the solution, provided that the current density at the cathode is preselected so that in conjunction with the non-zinc-adherent characteristic of the cathode, the electrowon zinc inhibitor metal alloy will have, after homogenizing into particles, a density within the range 0.2–2.0 g/cc and a surface area within the range 0.5–6.0 $m^2/g$; removing zinc inhibitor metal alloy from the cathode and homogenizing it into particles by a method selected from brushing, stirring or blending; and recovering and drying the resulting zinc-inhibitor metal alloy into powder form.

The cation species is provided by dissolving the oxide, hydroxide, carbonate or sulfate of the inhibitor metal(s) in aqueous Group Ia metal hydroxide so as to maintain a concentration of 5–1000 ppm. At least one inhibitor metal is taken up in the product zinc, and preferably constitutes 0.001–4.0 (e.g., 0.04–4.0) percent by weight, based on the weight of the zinc.

In our U.S. Pat. No. 5,206,096 there is described and claimed a slurry for use in rechargeable metal-air batteries, comprising particulate, porous, zinc-containing material of a particle size within the range of 100–500 microns and having density within the range of 0.3–1.4 g/cc and a surface area within the range of 0.5–6.0 $m^2/g$, an aqueous solution of at least one Group Ia metal hydroxide, and an inorganic inhibitor ingredient effective to inhibit interaction of said particulate, porous, zinc-containing material and said aqueous solution to prevent evolution of hydrogen gas, wherein the weight ratio in said slurry between said porous zinc containing material, said aqueous solution and said inorganic inhibitor is 1:0.5–2.0:0.00005–0.04.

Said patent, however, does not teach or suggest the preparation of a high-performance, electrochemically-generated, zinc-inhibitor metal alloy powder as described and taught for the first time herein.

Similarly, in our U.S. Pat. No. 5,228,958 and in our published European Application 91312077 there is described and claimed a process for the regeneration of an at least partially-spent slurry having a dissolved phase and an undissolved phase for use in metal-air batteries, wherein zinc is combined with an inorganic corrosion inhibitor; however, a careful reading of both of these documents clearly shows that they teach and suggest the optional addition of an inorganic and/or organic inhibitor to the zinc after it has been removed from the cathode, and do not teach or specifically suggest the incorporation of inhibitor metals or ions in the zinc plating bath, whereby the zinc powder product is intrinsically alloyed with trace inhibitor metals.

As regards improved properties of the high-performance zinc over the previous "pure" zinc/inhibitor oxide mixture, it is obviously more convenient to have a one component inhibitor zinc alloy (especially when the raw material commodity purchased for manufacturing zinc alkaline or zinc-manganese dioxide batteries is a dry powder rather than a slurry, which is in fact the case). Superior performance is also to be expected in view of the fact that the alloyed single-phase zinc is more homogeneous in terms of inhibitor distribution (as a result of the co-plating step in the electrolytic process) as compared to physically mixed zinc/inhibitor oxide compositions.

The proposed zinc-inhibitor metal alloy will, of course, be superior to zinc from thermal atomization. Not only is the surface area of the proposed zinc higher, which allows greater power generation, but the proposed zinc is much more porous. In cell fabrication procedures in which a zinc/alkaline slurry is extruded (zinc-alkaline application) or pressed (zinc-air application) onto the anode current collector, the porous dendritic zinc particles can interlock together and densify, giving a highly-conductive zinc/KOH matrix much more effective for discharge than the equivalent non-compressible zinc particles/KOH mixture from thermal zinc.

The electrochemically-generated, zinc-inhibitor metal alloy powder of the present invention may additionally be used in other applications of zinc powder, for example, as a reducing agent for organic and inorganic synthesis reactions, and as an anti-corrosive pigment in paints. The zinc powder is characterized by a high porosity (apparent density 0.2-2 g/cc) and high surface area (0.5-6 $m^2/g$), while the particle size can be chosen over a range from 5-1000 microns. The zinc-inhibitor metal alloy powder is produced by electrowinning means as a slurry in alkaline solution having a zinc:alkaline solution ratio of 1:0.05-12. For battery applications particularly, the zinc slurry may be used directly to form the anode; for other applications, it may be preferable to separate the zinc from the alkali (for example, by water washing and drying) and to use the zinc as a dry powder. The parameters of the electrowinning process (e.g., current density of the electroplating stage, concentration of corrosion inhibitors, etc.) may be varied to give a variety of zinc powder types and zinc compositions, depending on application.

As far as we are aware, the prior art (Linden, *Handbook of Batteries and Fuel Cells*, p. 7-5; also, *Kirk Othmer Encyclopedia of Chemical Technology*, Vol. 24, p. 205) is based on zinc powders from thermal atomization of molten zinc in an airjet, which produces lower porosity and lower surface area zinc powders (e.g., density 2.5-3.5 g/cc, surface area 0.1-0.4 $m^2/g$) compared with the electrochemically-generated zinc, with the thermal zinc giving substantially lower performance ratings. Performance improvements in the case of batteries are evident, especially in the areas of high discharge rate, zinc utilization and capability of sustained high power discharge.

Furthermore, the electrochemical process route is associated with fewer environmental problems as compared with the thermal one, in view of the relative difficulty of preventing toxic traces (e.g., lead) entering the atmosphere from a thermal process, versus the relative ease of process effluent control in a wet electrochemical process.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE 1

A clear solution (5 liters) containing 30 wt. % aqueous potassium hydroxide, 200 g dissolved zinc oxide and 0.5 g inhibitor lead (II) oxide, was transferred to an electrolytic bath which contained two immersed nickel anodes flanking a central vitreous carbon cathode. Each plate had the dimensions $50 \times 50 \times 3$ mm, and was fitted with current-carrying leads; there was a 20 mm space on each side between the cathode and the anodes.

An electrowinning current of 15 A (300 milliamp/$cm^2$ at the cathode) was applied to the electrowinning cell at a voltage of 2.4 V. The bath temperature stabilized at 70° C. without the need for external cooling. From time to time, deionized water or alkali was added to the bath to maintain the alkali concentration.

The cathode was scraped every 2 minutes for 10 seconds with a plastic blade, and every half hour the zinc that fell to the bottom of the bath was transferred to a separate container. This zinc was then blended with a blender into a particulate structure. The blending step afforded alkali-moist zinc particles below about 30 mesh particle size, and having a bulk density of 0.6 g/cc.

After about 115 minutes of electrolysis, there was obtained a quantity of alkali-moist zinc, containing about. 33 g dry zinc, thus indicating a current efficiency of about 95% at the specified current density. The zinc contained about 1000 ppm lead. By gasometric methods, the zinc was found to have a low gassing rate for hydrogen, 0.04 ml/hr/g zinc (compared to 0.2 ml/hr/g zinc for undoped zinc), on attempted reaction with 30 wt. % KOH at 30° C. Similar results were obtained using inhibitor cation(s) other than those from lead (II) oxide.

It was surprisingly found that the zinc from electroplating baths with a low or insignificant amount of inhibitor cation(s) could be given additional corrosion protection by simply reacting for some hours with a solution (e.g., alkaline) containing inhibitor cations. For example, lead-free zinc (33 g) stirred overnight with a liter of 30 wt. % KOH containing dissolved PbO (0.1 g) provided acceptable inhibition of corrosion on repeated recycling, with minimal makeup inhibitor. The lead-doped, alkaline-moist zinc was mixed with 25 g of 30 wt. % aqueous potassium hydroxide, and gave a slurry having a density of about 1.5 g/ml. Enough slurry to provide 33 g of zinc which exhibited no generation of hydrogen bubbles was introduced into the anode frame compartment of a zinc-air cell. The cell provided 2A for 10 hours at an average discharge rate of 1.2 V, until a cut-off voltage of 1.1 V. Since there were about 33 g zinc in the cell, the zinc utilization was about 75%. When the discharge was run with untreated zinc, the cell passivated after 15 minutes, due to excessive hydrogen gassing which blocked the electrolyte path to the air electrodes of the cell.

EXAMPLE 2

Following the details of Example 1, but substituting 0.05 g $Bi_2O_3$ and 0.05 g $In_2O_3$ in place of PbO gave similar results, but the corrosion rate was somewhat higher, 0.06 ml/hr/g zinc.

EXAMPLE 3

1 kg of electrochemically-generated, mercury-free zinc powder alloyed with bismuth and indium was prepared according to the procedure of Examples 1 and 2. The powder, after washing and drying, had a surface area of 0.5 $m^2$/g, a density of 1.5 g/$cm^2$, and trace alloying constituents of 200 ppm bismuth and 200 ppm indium, which gave a corrosion rate at 30° C. in 30 wt. % KOH of less than 0.1% per week. A gelled anode mixture was made, containing 70 wt. % zinc., 6 wt. % carboxymethyl cellulose binder and balance aqueous 30 wt. % KOH. The viscous mixture was extruded into the anode compartment of a small number of AA size cells of the zinc-manganese dioxide type. Upon running controlled discharges with the electrochemical zinc bearing cells at the 10 hour discharge rate, a consistent 10% higher capacity was obtained with these cells, compared with equivalent cells containing the same zinc content and anode formulation based on thermally-generated zinc.

EXAMPLE 4

The cell performance in Example 3 may have been limited by the invariable manganese dioxide cathode. In order to show the high power capabilities of electrochemically-generated zinc, two zinc-air cells were constructed with high-performance air cathodes. The cells each comprised two AE-20 type air electrodes (Electromedia Ltd.) of active area 10×10 cm, flanking a central zinc anode. The zinc anode comprised zinc powder (100 g) mixed with 30 wt. % KOH (50 g) pressed onto a copper screen, and once the anode was inserted between the cell electrodes, the cell was topped off with electrolyte (30 wt. % KOH). One cell was assembled using electrochemically-generated zinc (see Example 3) and a second cell with commercially-available, thermally-generated zinc. For both cells, under a five times stoichiometric air flow, the open current voltage was 1.45 V. The electrochemically-generated zinc cell sustained 80A at 0.9 V for 30 seconds, and could be continuously discharged at 30A for 2 hours to a 0.85 V cutoff, delivering 60 Ahr capacity. By comparison, the thermally-generated zinc cell could sustain a peak of only 50A at 0.6 V for 10 seconds, while the maximum achievable continuous discharge to the 0.85 V cutoff was 10A for 5 hours, giving a capacity of 50 Ahr.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. An electrochemically prepared zinc powder having an apparent density of about 0.2-2 g/cc and a surface area of about 0.5-6 $m^2$/gm and further having at least one corrosion inhibitor metal intrinsically alloyed therein; said corrosion inhibitor metal selected from a group consisting of antimony, bismuth, cadmium, gallium, indium, lead, tin, and mixtures thereof.

2. An electrochemically prepared zinc powder according to claim 1, having a particle size of about 5-1000 microns.

3. An electrochemically prepared, high-performance, zinc powder according to claim 1, wherein said inhibitor metal is lead.

4. An electrochemically prepared, high-performance, zinc powder according to claim 1, wherein said inhibitor metal is a mixture of bismuth and indium.

5. An electrochemically prepared, high-performance, zinc powder according to claim 1, wherein said inhibitor is present in said alloy in a weight ratio of zinc to inhibitor of 1:0.00001-0.04.

6. An electrochemically-generated, zinc-inhibitor metal alloy powder, prepared by a process comprising:
electrolyzing an admixture of:
(a) zinc which has been at least partly oxidized to an oxidation product selected from the group consisting of zinc oxide, zinc hydroxide and zincates;
(b) an aqueous solution of at least one Group Ia metal comprising anions selected from the group consisting of hydroxide and zincate; and
(c) an inhibitor metal effective to inhibit the interaction of zinc and at least one Group Ia metal hydroxide in aqueous solution, which would otherwise result in the evolution of hydrogen gas, said inhibitor metal being capable of forming an alloy with zinc and being present in said admixture as a cation species selected from the group consisting of antimony, bismuth, cadmium, gallium, indium, lead, tin or a mixture thereof in a cell with a corrosion-resistant anode and a non-zinc-adherent cathode such that the zinc and inhibitor metal which codeposit on said cathode self-detach or are removable by a method selected from brushing, scraping, vibrating, the use of liquid jets, either fixed or moving, and the use of electrical pulsing, until no more than a preselected amount of zinc remains in the solution, provided that the current density at the cathode is preselected so that in conjunction with the non-zinc-adherent characteristic of the cathode, the electrowon zinc inhibitor metal alloy will have, after homogenizing into particles, a density within the range 0.2-2.0 g/cc and a surface area within the range 0.5-6.0 $m^2$/g;
removing zinc-inhibited metal alloy from the cathode and homogenizing it into particles by a method selected from brushing, stirring or blending; and
recovering and drying the resulting zinc-inhibitor metal alloy into powder form.

7. A battery anode comprising an electrochemically-prepared zinc powder according to claim 1.

8. A battery anode comprising a aqueous slurry of KOH and electrochemically-prepared zinc powder according to claim 1, pressed onto an anode collector.

9. A battery anode comprising an aqueous slurry of KOH and electrochemically-prepared zinc powder according to claim 1, extruded onto an anode collector.

* * * * *